United States Patent
Rueckert et al.

(10) Patent No.: US 12,197,192 B2
(45) Date of Patent: Jan. 14, 2025

(54) CONTROLLING AN INDUSTRIAL PROCESS USING VIRTUALIZED INSTANCES OF CONTROL SOFTWARE

(71) Applicant: ABB Schweiz AG, Baden (CH)

(72) Inventors: Julius Rueckert, Langen (DE); Heiko Koziolek, Karlsruhe (DE); Sten Gruener, Laudenbach (DE); Staffan Andersson, Lund (SE)

(73) Assignee: ABB Schweiz AG, Baden (CH)

( * ) Notice: Subject to any disclaimer, the term of this patent is extended or adjusted under 35 U.S.C. 154(b) by 352 days.

(21) Appl. No.: 17/700,981

(22) Filed: Mar. 22, 2022

(65) Prior Publication Data
US 2022/0308559 A1    Sep. 29, 2022

(30) Foreign Application Priority Data

Mar. 23, 2021 (EP) ..................................... 21164229

(51) Int. Cl.
*G05B 19/418*    (2006.01)

(52) U.S. Cl.
CPC ..... *G05B 19/4184* (2013.01); *G05B 19/4188* (2013.01); *G05B 19/41885* (2013.01)

(58) Field of Classification Search
CPC ............. G06F 11/1641; G06F 11/1687; G06F 11/2097; G06F 11/1695; G06F 11/2028;
(Continued)

(56) References Cited

U.S. PATENT DOCUMENTS

| | | | |
|---|---|---|---|
| 4,959,768 A * | 9/1990 | Gerhart | G06F 11/2097 714/13 |
| 5,016,244 A * | 5/1991 | Massey, Jr. | H04L 69/40 370/217 |

(Continued)

FOREIGN PATENT DOCUMENTS

| | | |
|---|---|---|
| EP | 0974903 A2 | 1/2000 |
| EP | 1249744 A1 | 10/2002 |

(Continued)

OTHER PUBLICATIONS

Greenfield, "Changing the Controller Redundancy Paradigm," *Automation World*, downloaded from the Internet on May 24, 2022, at https://www.automationworld.com/control/article/21139329/changing-the-controller-redundancy-paradigm, 5 pp. (Jul. 7, 2020).

(Continued)

*Primary Examiner* — Darrin D Dunn
(74) *Attorney, Agent, or Firm* — Leydig, Voit & Mayer, Ltd.

(57) ABSTRACT

A method for controlling an industrial process includes providing process data of the industrial process to an active instance of a control software as input, based on this input, updating an internal state of the active instance of the control software that is characterized by a set of internal variables of this active instance; based on this updated internal state, determining an output signal and outputting this output signal to at least one piece of equipment that is configured to alter a state, and/or a behavior, of the industrial process. The method further includes providing a prioritized subset of the internal variables that characterize the state of the active instance to at least one further instance of a control software that is configured to take over control of the industrial process in case of a failure and/or malfunction of the active instance.

18 Claims, 4 Drawing Sheets

(58) Field of Classification Search
CPC .............. G06F 11/2046; G06F 11/202; G06F 11/1479; G06F 11/1415; G06F 11/1451; G06F 11/1453
See application file for complete search history.

(56) References Cited

U.S. PATENT DOCUMENTS

| | | | | |
|---|---|---|---|---|
| 5,136,498 | A * | 8/1992 | McLaughlin | G06F 11/2017 714/11 |
| 5,142,470 | A * | 8/1992 | Bristow | G06F 11/1687 700/79 |
| 5,202,822 | A * | 4/1993 | McLaughlin | G05B 9/03 714/11 |
| 5,426,774 | A * | 6/1995 | Banerjee | G06F 11/2043 714/E11.13 |
| 5,980,078 | A * | 11/1999 | Krivoshein | G06F 9/44505 700/1 |
| 6,272,386 | B1 | 8/2001 | McLaughlin | G05B 19/4184 700/82 |
| 9,342,346 | B2 | 5/2016 | Maislos et al. | |
| 9,344,494 | B2 | 5/2016 | Mordani et al. | |
| 9,609,609 | B2 * | 3/2017 | Deck | H04Q 9/00 |
| 9,626,634 | B2 * | 4/2017 | Schroeder | G06F 11/3457 |
| 9,990,286 | B1 | 6/2018 | McLughlin et al. | |
| 10,073,749 | B2 * | 9/2018 | Ferranti | G06F 11/1658 |
| 11,635,980 | B2 * | 4/2023 | Nixon | G06F 9/541 718/105 |
| 2002/0083364 | A1 * | 6/2002 | Christensen | G06F 11/2005 714/13 |
| 2003/0005350 | A1 * | 1/2003 | Koning | H04L 69/40 714/4.11 |
| 2004/0255187 | A1 * | 12/2004 | Gabriel Vecoven | G06F 11/1004 714/E11.026 |
| 2007/0147232 | A1 * | 6/2007 | Takehara | G05B 9/02 370/242 |
| 2007/0168058 | A1 * | 7/2007 | Kephart | G06F 11/2028 714/E11.08 |
| 2012/0117416 | A1 * | 5/2012 | McLaughlin | G06F 11/1658 714/E11.073 |
| 2013/0131837 | A1 * | 5/2013 | Washington | F24F 13/068 700/12 |
| 2016/0036626 | A1 * | 2/2016 | Bale | H04L 41/0663 370/242 |
| 2016/0165463 | A1 * | 6/2016 | Zhang | H04L 43/10 370/218 |
| 2016/0299497 | A1 * | 10/2016 | McLaughlin | G05B 19/4185 |
| 2017/0046237 | A1 * | 2/2017 | Clay | G06F 11/0709 |
| 2017/0075783 | A1 * | 3/2017 | Panara | G06F 11/2092 |
| 2017/0169089 | A1 * | 6/2017 | Molnar | G06F 16/178 |
| 2017/0199515 | A1 * | 7/2017 | Bhat | G05B 9/03 |
| 2018/0316729 | A1 | 11/2018 | Chauvet et al. | |
| 2018/0364673 | A1 | 12/2018 | Van Wensen et al. | |
| 2019/0266054 | A1 | 8/2019 | Kumarasamy et al. | |
| 2019/0334351 | A1 * | 10/2019 | Majumder | G05B 9/02 |
| 2020/0042410 | A1 * | 2/2020 | Gupta | H04L 67/1097 |
| 2020/0278856 | A1 * | 9/2020 | Andersson | G06F 8/65 |
| 2020/0280615 | A1 * | 9/2020 | Andersson | H04L 67/125 |
| 2020/0310920 | A1 * | 10/2020 | Mclaughlin | G05B 19/4185 |
| 2021/0255605 | A1 * | 8/2021 | Mclaughlin | G06F 11/2041 |
| 2021/0302927 | A1 * | 9/2021 | McLaughlin | G06F 11/1658 |
| 2022/0308859 | A1 * | 9/2022 | Koziolek | G06F 8/61 |
| 2023/0060849 | A1 * | 3/2023 | Mclaughlin | G06F 11/327 |
| 2023/0155368 | A1 * | 5/2023 | Du | H02J 9/068 361/78 |
| 2023/0267035 | A1 * | 8/2023 | Hogan | G06F 11/3409 714/38.1 |

FOREIGN PATENT DOCUMENTS

| | | |
|---|---|---|
| EP | 2457159 | 5/2012 |
| EP | 3522013 A1 | 8/2019 |
| WO | WO 2018/015454 A1 | 1/2018 |

OTHER PUBLICATIONS

Nakamura et al., "Skewed checkpointing for tolerating multi-node failures," *Proceedings of the 23rd IEEE International Symposium on Reliable Distributed Systems*, 2004, IEEE, 10 pp. (2004).

Stattelmann et al., "Optimized Incremental State Replication for Automation Controllers," *Proceedings of the 2014 IEEE Emerging Technology and Factory Automation (ETFA)*, IEEE, 10 pp;. (2014).

European Patent Office, Extended European Search Report in European Patent Application No. 21164229.3, 15 pp. (Nov. 11, 2021).

European Patent Office, Partial European Search Report in European Patent Application No. 21164229.3, 15 pp. (Sep. 16, 2021).

* cited by examiner

CONTROLLING AN INDUSTRIAL PROCESS USING VIRTUALIZED INSTANCES OF CONTROL SOFTWARE

CROSS-REFERENCE TO RELATED APPLICATIONS

This patent application claims priority to European patent application ser. no. EP21164339.3, filed on Mar. 23, 2021, which is incorporated herein in its entirety by reference.

FIELD OF THE DISCLOSURE

The present disclosure relates to software-driven control of an industrial process that remains reliable even if an instance of the control software fails or malfunctions.

BACKGROUND OF THE INVENTION

In industrial automation systems, control applications maintain an internal state as a function of input signals (e.g. sensor readings from a chemical process) and a system clock. In each calculation cycle (e.g. every 100 ms), the control program processes its current input signals and its current internal state (i.e. the values of internal variables) to calculate output signals. For non-trivial control applications, internal state can be a result of long approximation processes and do not only depend on the current input signals. A typical example is the use of PID controllers that continuously apply corrections to a control function. PIDs include calculating an integral value, which depends on all past input signal values since initialization and the progressing clock. In case of a control program reset (e.g. as result of restart of control device on power failure), it can be crucial to maintain such internal state to enable a seamless continuation of process control.

While this problem has been solved for simple scenarios with special purpose hardware controllers, it is challenging without such hardware in containerized and clustered environments. In settings with hardware controllers, either redundant controllers are synchronized via a dedicated high-bandwidth, low-latency communication channel, or state is persisted to non-volatile storage (e.g. in every execution cycle). In containerized and clustered environments, a complete synchronization among multiple control application instances is challenging because of shared network resources and clock synchronization. Also, a tight coupling of individual control applications instances is inflexible and hinders an integration of failover mechanisms with container orchestration solutions. As a result, setups with more than two redundant control application instances are difficult to implement because of the required communication overhead.

BRIEF SUMMARY OF THE INVENTION

The present disclosure provides system and methods that facilitate the deployment of instances of control software in containerized and clustered environments while still meeting given requirements on reliability and/or availability.

This objective is achieved by a method for controlling an industrial process according to a first independent claim, and by a method for configuring an industrial control system according to a second independent claim. Further advantageous embodiments are detailed in the respective dependent claims.

BRIEF DESCRIPTION OF THE SEVERAL VIEWS OF THE DRAWING(S)

In the following, embodiments of the disclosure are described using Figures without any intention to limit the scope of the invention.

DETAILED DESCRIPTION OF THE INVENTION

The present disclosure relates to systems and methods for controlling industrial processes using virtualized instances of control software. It should be appreciated that the methods described herein can be executed or implemented in software and/or hardware operating on non-transitory computer media and can include computer executable instructions. The framework for executing these methods to carry out tangible control of industrial equipment can be implemented in software that is operating at local computer systems in an industrial site, or in cloud-based platforms that are in command communication with various industrial machines and systems.

Therefore, it should be appreciated that the described operations of the methods described are operated using processing components, that include code, which may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware.

A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc.

The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 1:
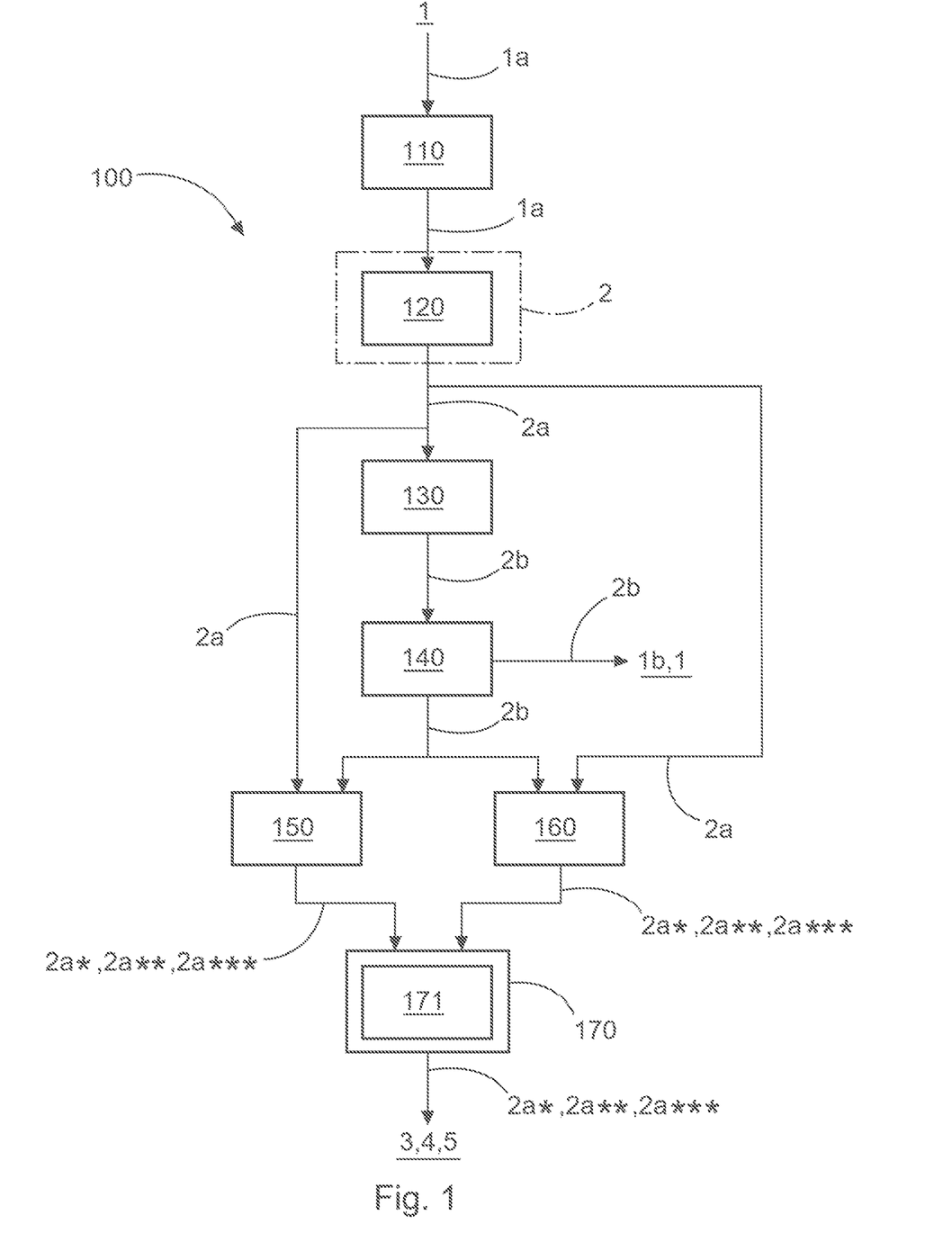
FIG. 1 is a schematic of an exemplary embodiment for a method in accordance with the disclosure.

FIG. 1 is a schematic flow chart of an exemplary embodiment of the method 100 for controlling an industrial process 1. In step 110, process data 1a of the process 1 is provided to an active instance 2 of a control software as input. Based on this input, the active instance 2 updates its internal state 2a in step 120. In step 130, based on the updated internal state 130, an output signal 2b is generated. In step 140, this output signal 2b is outputted to at least one piece of equipment 1b that is configured to alter a state, and/or a behavior, of the industrial process 1. As discussed before, examples of equipment 1b include actuators that directly act upon the process 1, as well as low-level controllers that keep certain process parameters at a set-point value.

FIG. 1 shows two exemplary ways of obtaining a prioritized subset $2a^*$, $2a^{}$, $2a^{*}$ of the internal variables that characterize the state 2a of the active instance. In step 150, this prioritized subset $2a^*$, $2a^{}$, $2a^{*}$ is determined by an analysis of the source code and/or object code of the control software that is used as the active instance 2. In step 160, the prioritized subset $2a^*$, $2a^{}$, $2a^{*}$ is determined by an analysis of markings of internal variables, and/or markings of process or plant variables on which these internal variables depend, with a retain level.

Irrespective of how the prioritized subset $2a^*$, $2a^{}$, $2a^{*}$ has been determined, in step 170, the prioritized subset $2a^*$, $2a^{}$, $2a^{*}$ is provided to at least one further instance 3, 4, 5 of a control software. These instances may contain software that is identical to the software used in the active instance, but software diversity may be deliberately introduced here, e.g., in order to further improve reliability. According to block 171, differently prioritized subsets $2a^*$, $2a^{}$, $2a^{*}$ of internal variables may be provided to different further instances 3, 4, 5 of a control software.

Figure 2:
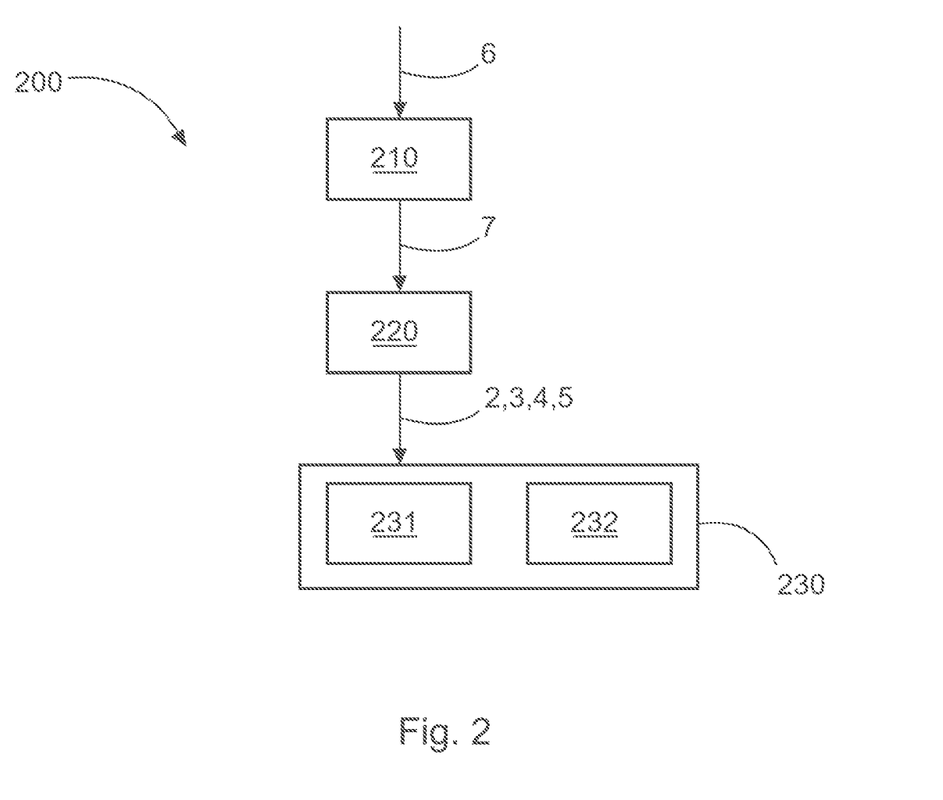
FIG. 2 is a schematic of an exemplary embodiment for a method of configuring an industrial control system to control a process in accordance with the disclosure.

FIG. 2 is a schematic flow chart of an exemplary embodiment of the method 200 for controlling an industrial process 1 according to the method 100 described above.

In step 210, a given set of requirements for the behavior of the control system that this system shall exhibit in case of failure and/or malfunction of an active instance 2 is mapped to a configuration 7. This configuration 7 comprises one or more further instances 3, 4, 5 of a control software that are to take over control of the industrial process 1 following the failure and/or malfunction, as well as respective prioritized subsets $2a^*$, $2a^{}$, $2a^{*}$ of internal variables of the active instance 2 that are to be provided to these further instances 3, 4, 5.

In step 220, at least the one or more further instances 3, 4, 5 are created according to the so-determined configuration 7 in respective virtualized execution environments on at least one virtualization platform. In the example shown in FIG. 2, the active instance 2 is created in step 220 as well.

In step 230, a transfer of the respective prioritized subsets $2a^*$, $2a^{}$, $2a^{*}$ of internal variables from the active instance 2 to the respective further instances 3, 4, 5 of a control software is orchestrated and/or performed. According to block 231, this orchestrating may comprise setting up at least one communication channel between the active instance 2 and at least one further instance 3, 4, 5. According to block 232, performing a transfer of prioritized subsets $2a^*$, $2a^{}$, $2a^{*}$ of internal variables to further instances 3, 4 5 may comprise buffering prioritized subsets in the failover manager and/or other management entity 10, 11.

Figure 3:
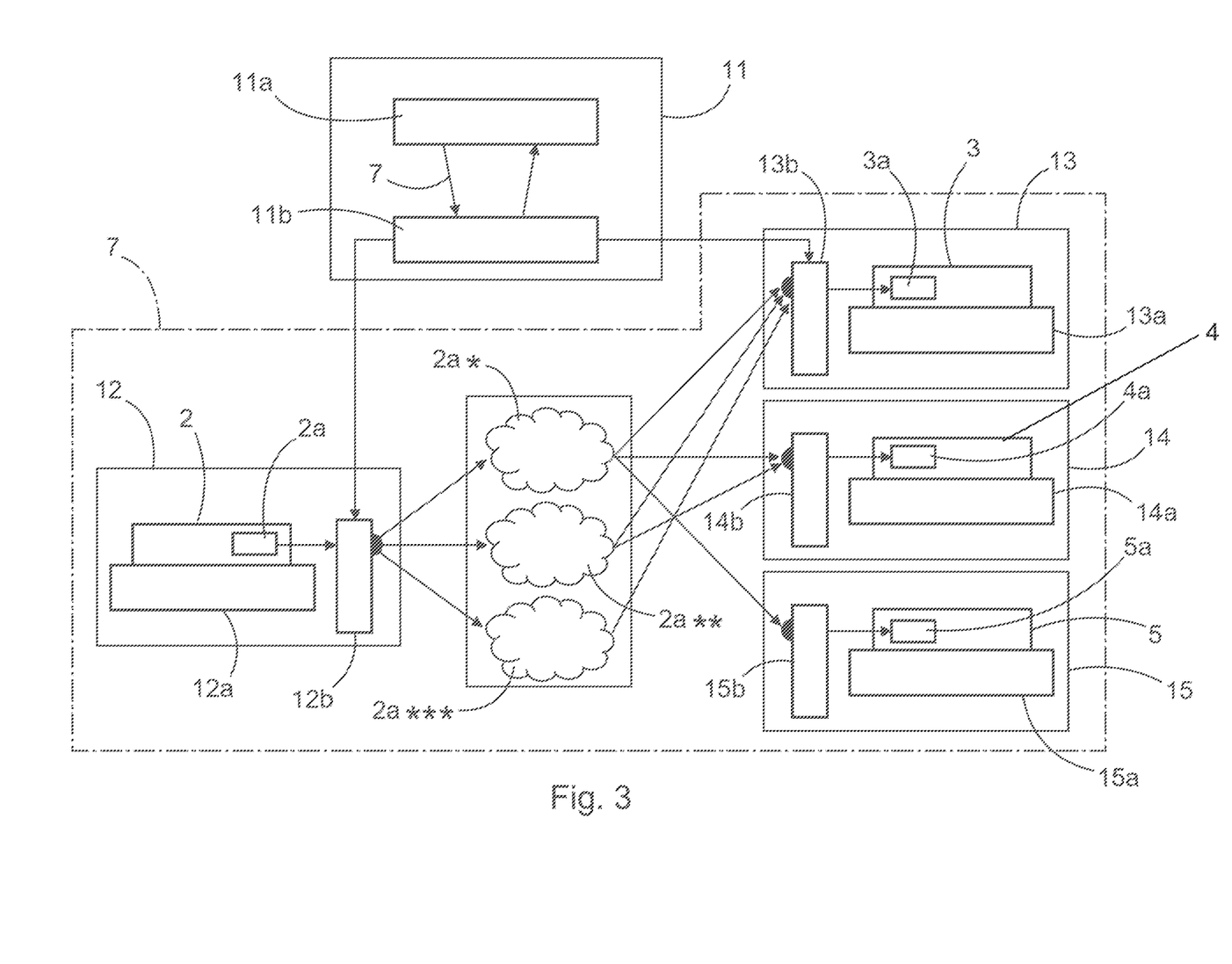
FIG. 3 is a schematic of an exemplary configuration generated by a method shown in FIG. 2.

FIG. 3 shows a first exemplary embodiment of a configuration 7 that may be a result of the method 200. In the example shown in FIG. 3, a management cluster 11 is used as a management entity that configures the instances 2, 3, 4, 5 of a control software and the failover behavior. The management cluster 11 comprises a container orchestration module 11a and a failover manager 11b. The container orchestration module 11a determines the configuration 7. The failover manager 11b launches and configures instances 2, 3, 4, 5 according to this configuration 7, and confirms to the container orchestration module 11a that the configuration 7 has been implemented.

The active instance 2 for normal operation of the industrial process 1 is deployed in a container 12 that comprises a virtualized execution environment 12a for the active instance 2 and a failover agent sidecar 12b. The failover agent sidecar 12b extracts, from the internal state 2a of the active instance 2, a first prioritized subset $2a^*$ of internal variables labelled "coldretain",
a second prioritized subset $2a^{**}$ of internal variables labelled "retain", and
a third prioritized subset $2a^{***}$ of internal variables labelled "other".

All the different subsets $2a^*$, $2a^{}$, $2a^{*}$ of internal variables are published in a publish/subscribe system on separate channels that may be subscribed by further instances 3, 4, 5 of control software.

In the example shown in FIG. 3, the configuration 7 further comprises a hot failover instance 3 of control software deployed in a container 13,
a warm failover instance 4 of control software deployed in a container 14, and
a cold failover instance 5 of control software deployed in a container 15.

Like container 12, each container 13, 14, 15 comprises its own virtualized execution environment 13a, 14a, 15a for the respective instance 3, 4, 5, as well as its own failover agent sidecar 13b, 14b, 15b.

Failover agent sidecar 13b subscribes to all subsets $2a^*$, $2a^{}$, $2a^{}$ of internal variables and uses these to update the internal state 3a of the instance 3.

Failover agent sidecar 14b subscribes only to the "coldretain" subset $2a^*$ and to the "retain" subset $2a^{}$ of internal variables and uses these to update the internal state 4a of the instance 4. It does not subscribe to the "other" subset $2a^{*}$ of internal variables.

Failover agent sidecar 15b subscribes only to the "coldretain" subset $2a^*$ and uses this to update the internal state 5a of the instance 5.

The failover roles of all failover agent sidecars 12b, 13b, 14b and 15b are configured by the failover manager 11b in the management cluster 11.

Figure 4:
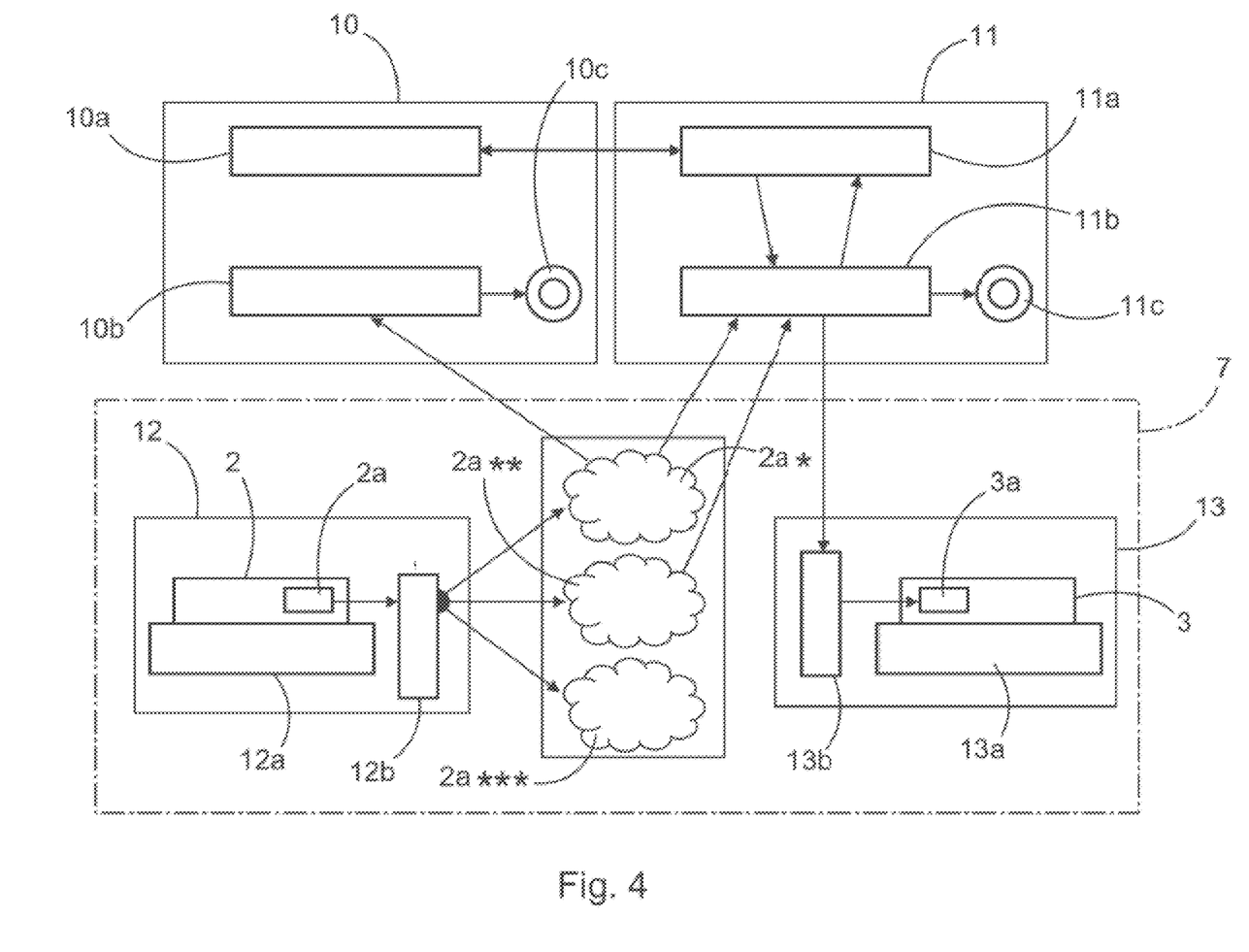
FIG. 4 is a second exemplary configuration generated by the method shown in FIG. 2.

FIG. 4 shows a second exemplary embodiment of a configuration 7 that may be a result of the method 200. Here, two redundant management entities 10, 11 are used. Each management entity 10, 11 comprises a container orchestration module 10a, 11a and a migration manager 10b, 11b.

Akin to FIG. 3, the active instance 2 of control software is deployed in a first container 12 with a virtualized execution environment 12a and a failover agent sidecar 12b. From the internal state 2a of the active instance 2, the failover agent 12b again extracts a "coldretain" subset 2a*, a "retain" subset 2a*, and an "other" subset 2a** of internal variables. All these subsets 2a*, 2a and 2a* are again published on separate channels in a publish/subscribe system.

The migration manager 10b in management entity 10 subscribes to the "coldretain" subset 2a* only and buffers records of this subset 2a* in a ring buffer 10c of a fixed size. The migration manager 11b in management entity 11 subscribes both to the "coldretain" subset 2a* and to the "retain" subset 2a**. Received records are buffered in a ring buffer 11c. When the ring buffers 10c, 11c are full and the next record comes in, the respective oldest record in the ring bugger 10c, 11c is discarded to make room for the new record.

In the situation shown in FIG. 4, the container orchestration module 11a in management entity 11 instructs the migration manager 11b to failover from the active instance 2 to a new to-be-created instance 3, so that the active instance 2 may be migrated to other hardware (or any other maintenance work may be performed on it). The migration manager 11b causes the instance 3 to be spun up in a container 13 with virtualized execution environment 13a and failover agent sidecar 13b. Failover agent sidecar 13b gets the records of the "coldretain" subset 2a* and the "retain" subset 2a** from the ring buffer 11c of the migration manager 11b and uses these to update the internal state 3a of the newly created instance 3, so that this can take over the job of the active instance 2. The migration manager 11b then confirms the successful failover to the container orchestration module 11a.

The invention provides a method for controlling an industrial process. In the course of this method, process data of the industrial process are provided to an active instance of a control software as input. The process data comprises a set of process variables of the industrial process, and/or plant variables of the industrial plant executing this process. For example, the process data may comprise any kind of sensor readings from the industrial plant, and/or any kind of operational states of equipment in the industrial plant, such as on/off switching states of equipment, open/closed states of valves, and/or set-points of low-level controllers in the plant. For example, such a low-level controller may control equipment in the plant to maintain a temperature, a pressure, a fill level or some other process parameter at the desired set-point value.

Based on the input provided to it, the active instance of the control software updates its internal state. This internal state is characterized by a set of internal variables. That is, starting from an initialized execution environment with a fresh instance of the control software, the internal state of the active instance may be reproduced given these internal variables. In particular, the internal variables may comprise computation results or other values obtained on the basis of the input. As mentioned before, the internal state may also, for example, comprise integral values maintained within a PID control loop.

Based on the updated internal state, the active instance determines an output signal and outputs this output signal to at least one piece of equipment that is configured to alter a state, and/or a behavior, of the industrial process. For example, the output signal may be delivered to one or more actuators that directly act upon the physical behavior of the industrial process. But the output signal may, for example, also comprise set-points to be delivered to low-level controllers.

A prioritized subset of the internal variables that characterize the state of the active instance is provided to at least one further instance of a control software that is configured to take over control of the industrial process in case of a failure and/or malfunction of the active instance, and/or in maintenance scenarios. This further instance may comprise the same control software as the active instance, but may also comprise a different control software. For example, software diversity between the active instance and the further instance may be deliberately employed to prevent one single problem from failing all available instances at the same time. In a maintenance scenario, a primary instance may deliberately "fail" because it was forcefully killed as a result of a normal maintenance task of, e.g. the cluster hardware. The technician in the data center is not a control expert and needs to trust that the system continues functioning and repairs itself if a hardware node is removed. Another example of a maintenance scenario is an operating system upgrade on a node of the cluster.

As mentioned above, for many industrial processes, the handover of control during a failover from an active instance to a further instance of a control software may be extremely time-critical. For some processes, handover needs to be completed within 100 ms or less. For example, many chemical process recipes dictate very tight ranges in which process parameters are to be maintained. If any one of these process parameters breaks out of its range, the recipe is violated, and the whole batch that is being handled can no longer be sold as a product that conforms to the given specification. There may be further adverse consequences if the product solidifies, decomposes, ignites or explodes due to the violation, or if a pressure or temperature climbs too high and causes equipment damage. In particular, while a sudden increase in temperature is slowed by thermal capacities in the system, a pressure may increase very rapidly.

If a further instance is to seamlessly take over control of the process in a "hot failover", it therefore needs constant updates of the state of the active instance. However, in a containerized or otherwise virtualized environment, communication bandwidth for these updates is limited. The straight-forward solution would be to take the requirement for constantly copying the complete state of the active instance over to the further instance as a given and just provide the required bandwidth no matter what. The present invention, however, proposes to copy only a prioritized subset of the internal variables over. The output of the further, failover instance may then depart to some extent from the output that the active instance would have produced. Some accuracy of the control behavior may therefore be sacrificed. But in return for this sacrifice, the time required for the failover is greatly reduced. In particular, if an industrial process may evolve very rapidly, it is more important to take an action earlier than it is to take exactly the ideal action. The situation is somewhat akin to the lossy compression of images. For example, using JPEG2000, a 640×480 pixel color image may be compressed to 1-2 Kbytes. A compressed version of such a small size may be transmitted over a network very quickly and still contains all information of the scene that is needed to take immediate action.

Moreover, the requirements on the execution environments for the instances of the control software are eased, greatly facilitating a deployment in a containerized or otherwise virtualized environment. Compared with a deployment of hardware controllers, a virtualized deployment provides a much higher flexibility and a much lower operating cost because hardware is being used in a potentially shared manner. But this shared usage limits communication bandwidth and processing resources. By transmitting only a prioritized subset of internal variables, time is saved, so that the virtualized environment becomes fast enough for the task at hand. Even if some dedicated hardware, such as a processor or a core thereof, is assigned to an instance of the control software, the mentioned flexibility is advantageous because these assignments may be adapted dynamically. For example, in case of maintenance or outages, resources may be reassigned seamlessly.

The determining of the prioritized subset may be determined in an automated manner. For example, a computerized analysis of the source code and/or object code of the control software that is used as the active instance may be performed. This analysis may be performed as a preparatory step before starting up the control software. But depending on the available computing capacity, the analysis may also be performed ad-hoc while the control software is running. The analysis may comprise a static analysis, but alternatively or in combination, it may also comprise executing the object code in a sandbox and monitoring its behavior. The analysis yields which internal variables are more important than other internal variables for the executed control task. Here, one potential meaning of importance can be derived from the impact a specific internal variable or a set of variables has on actuation decisions.

In particular, the code analysis may comprise an evaluation of names of accessed variables, dependencies between variables (e.g., one variable might be merely a result of a simple calculation based on other more important variables), and/or markings of accessed variables with a "retain" level. As per IEC 61131-3 and related standards, it is common practice in the development of control applications to label internal variables that are deemed to be important already at the time of design of the control software. Thus, effort that has already been expended when creating code, including coding the control software, may be re-used for determining the most important internal variables.

However, a more in-depth automated analysis may reveal the most important internal variables even if the control software is "black box" without meaningful variable names or variable markings.

For example, a frequency with which variables are accessed and/or used in computations may be evaluated. If the value of a variable is needed more often, it is likely to be more important than a variable that is only accessed once, or maybe even not read at all after having been written. For example, in the course of development, the variable may have been superseded by another one, but the "orphaned" old variable is still being computed.

Also, static dependencies between variables may be evaluated. In particular, a number of variables that are collectively dependent on any one particular variable may be evaluated. A variable on which a lot of other variables depend is very likely to be more important.

Furthermore, a quantitative dependency of the output of the control software on one or more particular variables may be evaluated. This quantitative dependency is in some way analogous to a "partial derivative" of the output of the control software with respect to the variable in question. If certain variables occupy much space, but the output of the control application changes very little if they are left out, then it may be beneficial to leave them out.

Apart from markings of internal variables that go into the control software, markings of process or plant variables on which certain internal variables depend may also be used to assess the importance of these internal variables.

In an advantageous embodiment, the prioritized subset of internal variables comprises
at least one internal variable that is indicative of, and/or dependent on, at least one pressure in the industrial plant executing the process; and/or
the current state of all Sequential Function Charts, SFCs, used in the active instance.

In particular, as discussed before, pressures are among the quantities that may change very quickly during chemical processes, and also during processes that require vacuum. For example, if there is a small leak in an ultra-high vacuum chamber and the pressure deteriorates from $10^{-9}$ mbar to $10^{-6}$ mbar, this is an increase in pressure by a factor of 1000.

SFCs describe, e.g., sequential steps of a process and actions that are to be triggered inside steps and on transitions between steps. For the handover of control to be seamless, the internal states of the SFCs may be needed. For example, these internal states may comprise information on currently active steps, as well as timers specific to an SFC.

In a particularly advantageous embodiment, differently prioritized subsets of internal variables are provided to different further instances of a control software that are configured to take over control of the industrial process within different time periods from the failure and/or malfunction of the active instance.

For example, there may be a "hot failover" instance of a control software that is configured to take over control immediately if the active instance becomes unavailable. To provide a higher level of redundancy, there may be a further "warm failover" instance that is being updated with less information from the active instance during normal operation, and a "cold failover" instance that is being updated with even less information. This reduces the consumption of communication bandwidth during normal operation. Also, the "warm failover" and "cold failover" instances may run at a lower priority or even be hibernated during normal operation, reducing the overhead in processing resources for the added redundancy.

If the active instance becomes unavailable and the "hot failover" instance takes over control, then the "warm failover" instance may receive a larger state update and more processing resources so that it may take over control from the "hot failover" instance immediately in case this "hot failover" instance fails next.

The "cold failover" instance may even be "cold" in the sense that it is only spun up in case the active instance fails, so as to restore the degree of redundancy to a desired level even though the active instance is no longer available.

In a further particularly advantageous embodiment, at least one further instance of a control software is configured to control the industrial process in a mode of operation that is degraded compared with a normal mode of operation performed by the active instance. In this manner, a lesser resource overhead has to be provided for the further instances. For example, degraded operation may mean that the industrial process is running much slower, so that it has less throughput. The lesser throughput will incur a cost. But if this happens, let's say, once a month for a couple of minutes, this cost may be lower than the cost of having to provide a virtualized environment with processing power for a whole duplicate of the active instance 24/7.

The disclosure also provides a method for configuring an industrial control system to control an industrial process according to the method described above. This method is performed by at least one failover manager or other management entity.

The method starts with mapping a given set of requirements for the behavior of the control system in case of failure and/or malfunction of an active instance of a control software to a configuration of:
one or more further instances of a control software that are to take over control of the industrial process following the failure and/or malfunction; and
respective prioritized subsets of internal variables of the active instance that are to be provided to these further instances.

At least the one or more instances are created according to the so-determined configuration in respective virtualized execution environments on at least one virtualization platform. A transfer of the respective prioritized subsets of internal variables from the active instance to the respective further instances of a control software is orchestrated and/or performed by the failover manager or other management entity. The active instance may be part of the to-be-created configuration as well. That is, the complete control system, including the active instance and all further fallback instances, may be created by the failover manager and/or other management entity. But the method may also be performed without central coordination, i.e., without a failover manager in a peer-to-peer or otherwise decentralized manner.

If a management entity is used, the plant operator only needs to specify the requirements without having to know any details of the virtualization platform, its capabilities and its current usage state. All these details are taken care of by the failover manager or other management entity. In particular, a seamless adaptation to any changes to the virtualization environment is possible. For example, the whole virtualization environment may be moved to another hardware somewhere else on the premises with a different network latency. In this case, the failover manager may automatically re-compute the configuration of instances that needs to be deployed so that the given requirements are met.

In particular, the mapping to a configuration may be based at least in part on one or more of:
a requirement for a level of reliability of the control of the process;
a requirement for a maximum time period after the failure and/or malfunction during which at least one further instance must take over control of the industrial process;
a time required to create and/or initialize at least one further instance on the virtualization platform;
an availability of resources for creating further instances on the virtualization platform;
an available communication bandwidth between the active instance and at least one further instance; and
a state and/or phase of the industrial process.

That is, the failover manager and/or other management entity may act as a "broker" that brings requirements from the domain of the plant operator and a given technical situation on the side of the virtualization platform together. The plant operator does not even have to know any details about the virtualization platform that is in use. Consequently, in the example where the virtualization environment is moved to a different hardware or changed in some other way, no further input from the plant operator is required to determine the updated configuration.

By making the mapping dependent on the state of the industrial process, the failover manager and/or other management entity may take into account that the requirements for failover may be very different in different phases of the industrial process. For example, maximum redundancy with a multitude of further failover instances may be necessary in a phase of a chemical process where an explosive intermediate product is present. But only one failover instance may be required in the final phase where the finished product, which is no longer explosive, is merely packaged.

In particular, orchestrating the transfer of prioritized subsets of internal variables to further instances may comprise setting up at least one communication channel between the active instance and at least one further instance. For example, in a containerized environment, the instances of the control software in different containers initially do not know anything about each other. But the superordinate failover manager and/or other management entity may connect them.

In a particularly advantageous embodiment, the communication channel comprises publish/subscribe one-to-many communication, and/or a named pipe. If more than one further instance of the control software is involved, the one-to-many communication saves communication bandwidth. Also, the publish/subscribe nature of the communication requires changes to be made only on the side of the receiving further instance if a new such instance is added, or if the role of such an instance is changed, e.g., from "warm failover" to "hot failover".

In a further advantageous embodiment, the performing of a transfer of prioritized subsets of internal variables to further instances may comprise buffering prioritized subsets in the failover manager and/or other management entity. For example, a ring buffer of a fixed size may hold a rolling history of the latest states of the active instance. If the failover is not too time-critical, it may not be necessary to keep the further failover instance running all the time. Rather, the failover manager and/or other management entity may spin up the further instance when the active instance fails and failover becomes necessary. The freshly launched further instance may then be supplied with the states from the ring buffer.

The methods may be wholly or partially computer-implemented. The invention therefore also provides one or more computer programs with machine readable instructions that, when executed on one or more computers, cause the one or more computers to perform a method described above. In particular, a virtualization platform and one or more hardware controllers may be regarded as computers.

The disclosure also provides one or more non-transitory storage media and/or download products with the one or more computer programs. A download product is a product that may be sold in an online shop for immediate fulfillment by download. The invention also provides one or more computers with the one or more computer programs, and/or with the one or more non-transitory machine-readable storage media and/or download products.

In particular, the disclosure provides at least the following advantages:
Automatic selection and externalization of application state based on criticality. The criticality is determined based on existing annotations (e.g. retain) or automatically derived using static code analysis and analysis of variable change behavior during runtime.
Deriving concrete failover instance deployments based on high-level availability requirements, e.g. in terms of service-level agreements (SLAs), by the Failover Manager (software agent) and orchestrating these deployments. Given a desired level of application availability, the Failover Manager calculates how many redundant standby instances shall be active at any given time and how they are distributed across hardware nodes or, e.g., availability zones. These availability SLAs can be provided in terms of uptime percentages (e.g. 99.999%) or in terms of maximum tolerable downtime minutes/seconds per year/month/week.

Automatic spawning of application failover instances and assignment of failover roles by the Failover Manager. The failover agents, which are part of application deployment, monitor publishing rate violations and autonomously decide on taking over an active execution role.

In one embodiment, migration manager instances themselves also subscribe to state updates depending on its criticality (e.g. all instances subscribe to cold retains, a few to retains, only one to normal variables) and keep a temporal copy of the state to spawn new application instances on demand. This locally maintained state copy is used to spawn new applications instances in case no failover application is available to take over the execution.

The mechanisms described in this invention can be used for migration use cases in that applications need to be migrated among hosts. In this case, a failover instance would be spawned and synchronized before the active instance is shut down to force a failover. Depending on the migration time requirements, a full transfer or partial transfer can be done.

The disclosure enables customers to run control applications under high availability requirements in container orchestration environments. For this, no changes must be done to the way control applications are engineered. Even legacy/brownfield applications can be migrated to container orchestration environments without change to the control logic in case retain markers are already used and tested within the control logic. All required failover mechanisms are realized externally from the applications. Depending on the expressed failover requirements, the failover semantics of the applications in the new environment are well-defined and are like the anticipated behavior for hardware controller warm/cold restarts.

Key Ideas Include:

The idea to leverage control code retain-level annotations as well as automatically derived transfer priorities of internal variables based on their criticality for failover mechanisms in container orchestration setups to realize a flexible and highly configurable failover mechanisms of control applications.

The mechanism to externalize state based on the retain-level annotation semantics to meet user-defined high-availability and redundancy/failover requirements.

The mechanism to translate high-level user specification of high-availability and redundancy/failover requirements into concrete failover instance deployments that are robust to different types and severities of failure scenarios.

The monitoring-based failover mechanism that enables failover instances to autonomously or jointly detect failed application instances in a failover cluster to take over the control application execution.

In the following, exemplary embodiments are described without any intention to limit the scope of the invention.

For the actual delivery of the externalized state, access-, network-, or application-layer pub/sub mechanisms or application-layer subscriptions are used. For this, e.g., OPC UA mechanisms can be used, but the invention is not limited to that as it applies to other delivery mechanisms as well. The notion of efficiency in this context refers to the potential use of pub/sub mechanisms to reduce the network load (in case of state that is replicated to more than one failover instance) and the transmission of only state that changed. Here, incremental delivery mechanisms, such as the key-frame/delta-frame mechanisms and subscription semantics of OPC UA can be used.

Dead bands for individual variables can be defined to further reduce the rate of state change that needs to be transferred. This is possible by introducing additional annotations that a process engineer can add to variable definitions or that are automatically derived from the dead bands configured for input signals and automatically applied to variables that are depending on these signals.

Embodiments in accordance with the disclosure leverage the fact that control application engineers are used to manually annotate internal variables when engineering control applications. This is usually done by labeling variables with specific keywords, such as "retain" in case of IEC 61131-3 application code. The semantic of this annotation is that the variable's value is persisted, e.g., every processing cycle, to non-volatile storage to survive a restart of the application or the complete hardware controller. In some commercial control platforms, additional annotation levels, such as "cold-retain" are used to distinguish between different degrees of persistency requirements and provide the engineer an even more fine-grained control on the persistency overhead imposed by the application to the control platform. The invention is not specific to these retain levels but also applies to other retain levels and definitions. It is to be noted that control applications engineers reuse existing well-tested control logic libraries as part of their own applications. For these libraries, retain annotations either already exists and have been tested for live reconfiguration scenario, or only need to be derived once to be compatible with the envisioned retain-level-based state transfer mechanisms.

Besides leveraging the previously described existing manual annotations, the invention also considers automatically deriving state annotations using static code analysis as well as runtime monitoring of change behavior of variables. This way, variables without annotations can be considered relevant for a failover level based on the dependencies of other variables and control application logic on the variable itself. Variables with many static dependencies imply that their state is more critical to be transferred for a seamless failover than others without dependencies. This avoids that dependent variables would be impacted in case of a missing transfer. A variable deemed critical would be considered relevant and be transferred jointly with variables that were manually annotated, e.g., the retain variables. Similarly, the dynamic change behavior of a variable can lead to a decision to include a variable in a state transfer. Additional variables that slowly change over time could be considered for transfer because the overhead for the transfer is small using an incremental state transfer mechanism. Variables that quickly change over time, in contrast, could be also considered for a transfer depending on the number of dependencies on them. The failover agent local to the application instance monitors variables to dynamically determine and update the criticality of a variable for different failover levels. However, as this dynamic analysis might draw wrong conclusions due to non-obvious dependencies and actual criticality, the mechanisms can be used in a mode where no changes are done automatically, but an engineer or operational personnel needs to acknowledge any changes in monitored state variables.

For scenarios in that control application engineers have annotated too many variables as retain variables, the above mechanism can also help to automatically reduce the number of transferred variables to a smaller subset and thereby reduce the state replication effort.

The criticality rating of variables is used to unlock the ability to adapt the state replication to a control application's redundancy requirements. This makes the invention directly applicable to brownfield setups and applications in that any costly re-engineering of control code is avoided and, this way, well-tested and understood persistency settings for highly available control applications can be used to run the same applications in containerized environments with no change. The additional dynamic rating of criticality based on code and change analysis helps to fine-tune the replication and identify relevant state that was not correctly annotated by the control engineer.

A special attention needs to be paid to transferring relevant state of Sequential Function Charts (SFCs) in case of a failover. SFCs describe, e.g., sequential steps of a process and actions that are to be triggered inside steps and on transitions between steps. Step transitions can be triggered based on timers and Boolean conditions defined on variables and process signals.

To support a seamless continuation of the execution of a control program after a failover, it is essential to also transfer the current state all SFCs of the control program. This includes timers specific to an SFC and the information on currently active steps. Thus, changes to steps and SFC timers are transferred per default with the retain variables.

This semantics may be different to "normal" retainment behavior of the application for which an engineer can typically explicitly select whether to keep the SFC state or to move to initial state during CPU restart.

During runtime, the failover manager interacts with the container orchestration environment to detect the need to update the application deployment due to unavailable hosts. As a result, it requests the deployment of failover control application instances. The requirements (e.g., triple redundancy) can influence the deployment of the instances, e.g., to different hosts, clusters, or availability zones. Each instance is equipped with a sidecar container (the so called "Failover Agent") that receives a configuration and assigned role from the failover manager. Depending on the criticality, an application might have different types of failover instances. Hot failover instances are subscribing to all externalized state of the active application instance (coldretain, retain, other) as well as input signals of the application. Depending on the timing needs, the failover instances can be maintained in a dormant mode (no active execution of control code) or an active mode (constantly executing control code based on most recent state update). Per default, all types of failover instances are started as dormant instances. An alternative reactive mode in that cold standby instances are started only once a failure happens, is described in the next section.

As an optimization, actively executing hot failover instance can monitor the difference between local calculation results and remote ones it receives via the subscriptions. A soon as both are synchronized, the failover instance can stepwise reduce its subscriptions to a minimum to avoid unnecessary state transmissions. At a minimum, it subscribes to the inputs of the application and the output signals of the primary application instance to monitor its availability and its synchronization state. In case of discrepancies, subscriptions are established again to reach synchronization. From this description it should be clear that an actively executing hot failover instance trades the small amount of transferred state for more required compute resources it takes to execute the control application.

Failover instances do not write output signals but monitor the outputs of the active instance. The hot failover instances can immediately take over the role of the active instance, but also need to constantly process all state updates or actively execute the application themselves (see previous paragraph on dormant and active mode). Warm failover instances only subscribe to retain-level state updates, while cold failover instances subscribe to coldretain state updates only (if applicable to the control platform). Thereby, the warm and cold failover instances are potentially receiving a much smaller number of state updates, but also might take over the execution in a non-seamless manner. However, the well-defined retain semantics result in a failover behavior that, in worst case, is similar to the behavior of the traditionally deployed control application in case a hardware controller is restarted. Thus, the failover might not be seamless, but the behavior is well-defined and was anticipated by the control engineer and deemed acceptable for a specific industrial process.

It is to note that the overall approach of replicating state to potentially many failover instances at the same time, can imply a substantial network load. Thus, it can be necessary to limit the number of failover instances and roles depending on the network and host capabilities. For state-of-the-art compute cluster setups, however, this is not considered a problem. Here, network bandwidth is traded for the capability to achieve fast failovers and the flexibly to adapt to quickly heterogeneous and quickly changing environments. A potential optimization would be to keep multiple failover instances but only replicate the state to a fixed number of instances. In case of a failure, an instance with an active synchronization takes over and the state replication is extended to an additional instance.

The actual decision to take over the execution of an active application instance is taken by the individual failover agents themselves based on their role and an active monitoring of the received state updates and, optionally, the monitored output signal updates by the active instance. Subscriptions are configured to provide a regular heartbeat message for cases in that no state updates happen. This way, failed applications can be detected based on a preconfigured number of missed heartbeats in a quick manner. Failover instances can also monitor each other and use consensus mechanisms to determine a leader to define a deterministic failover sequence in case of more than one available instance per role. The failover manager monitors the availability of the application instances via the container orchestration framework, which takes care of automatically spawning new instances in case of changes the deployment (e.g. in case instances fail or container orchestration events happen).

In case of failed application instances, the failover manager ensures that missing output signals do not cause any process interruptions. For this, the failover manager might temporarily send keep-alive messages to the actuators, while a failover instance is started and configured. In case a failover cannot happen seamlessly because of a too long startup time, however, actuators might have to be reset together with the fresh start of the application (e.g. in case only cold failover instances exist or need to be started). In this case, actuators might first return to safe operational conditions while the application is started similar to a controller reset. In this case, also SFCs might be reset to achieve a safe process restart.

In certain settings it can more desirable to realize the monitoring mechanism and triggering of failovers as part of the failover manager or the orchestration framework. This can be of advantage in case of many standby nodes and a high-availability setup of the failover manager itself.

In a variant, a Migration Manager itself subscribes to state updates and monitors the availability of the primary application instance. It buffers the received state in a ring buffer that always contains a complete set of internal variables for the last execution cycle. Once a complete set for the next cycle is received, the old state is overwritten to limit the amount of state to be managed and maintained. In a cluster setup, also the management cluster is redundant. Thus, multiple Migration Manager instances subscribe to state updates. This, however, can happen in a manner that is dynamically adapted to the redundancy needs. One instance might subscribe to the full set of internal variables (all retain level variables and automatically retrieved variables), while a second instance functions as fallback which only maintains retain variables and configuration updates. This way, the second instance is only capable to start fresh cold failover instances.

When a Migration Manager detects the failure of the primary application instance, it immediately starts (powers up) a new failover instance and injects the last known state to this instance. To keep the failover time as short as possible, the application instances container images are tuned for a fast startup and the container images are pre-distributed to potential execution nodes as well as decompressed including all its dependencies for a rapid deployment and startup. For this, previously proposed extensions of container orchestration environments are used. As a result, a fast startup of the failover instance is possible that mainly depends on the time it takes to transfer and inject the state to the failover instance. This failover mode is expected to be suitable for applications with more relaxed cycle times (e.g. >100 ms). Depending on the size of the state and the network latency, also faster failovers might be feasible. This reactive failover realization can be also used complementary to the proactive failover mechanisms described before.

The described mechanism can be also used for application migration use cases. In this case, a failover instance is spawned, and a takeover of execution is triggered by simply triggering a shutdown/deletion of the active instance via the container orchestration environment. Here, the failover manager would wait for the failover instance to signal that the first complete (according to desired failover level) state transfer took place and issue the deletion of the relevant execution unit (e.g. the pod running the control application and its failover agent sidecar). Depending on the migration time requirements, a full transfer or partial state transfer can be done.

LIST OF REFERENCE SIGNS 1 industrial process
1a process data of process 1
1b equipment, acts on process 1
2 active instance of control software
2a internal state of active instance 2
2a* "coldretain" prioritized subset of internal variables of active instance 2
2a** "retain" prioritized subset of internal variables of active instance 2
2a*** "other" prioritized subset of internal variables of active instance 2
2b output signal
3 hot failover instance of control software
3a internal state of hot failover instance 3
4 warm failover instance of control software
4a internal state of warm failover instance 4
5 cold failover instance of control software
5a internal state of cold failover instance 5
6 requirements for behavior of control system
7 configuration of instances 2, 3, 4, 5 and subsets 2a*, 2a, 2a*
10, 11 management entities
10a, 11a container orchestration module in management entity 10, 11
10b, 11b migration manager/failover manager in management entity 10, 11
10c, 11c state ring buffer in management entity 10, 11
12 container for active instance 2
12a virtualized execution environment in container 12
12b failover agent sidecar in container 12
13 container for hot failover instance 3
13a virtualized execution environment in container 13
13b failover agent sidecar in container 13
14 container for warm failover instance 4
14a virtualized execution environment in container 14
14b failover agent sidecar in container 14
15 container for cold failover instance 5
15a virtualized execution environment in container 15
15b failover agent sidecar in container 15
100 method for controlling industrial process 1
110 providing process data 1a to active instance 2
120 updating internal state of active instance 2
130 determining output signal 2b
140 outputting output signal 2b to piece of equipment 1b
150 code analysis of control software of active instance 2
160 analysis of markings of variables
170 providing subsets 2a*, 2a, 2a* to further instances 3, 4, 5
171 using different subsets 2a*, 2a, 2a* for different instances 3, 4, 5
200 method for configuring industrial control system
210 mapping requirements 6 to configuration 7
220 creating further instances 3, 4, 5
230 orchestrating/performing transfer of subsets 2a*, 2a, 2a*
231 setting up communication channel
232 buffering subsets 2a*, 2a, 2a*

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for configuring an industrial control system to control an industrial process, comprising:
   providing process data of the industrial process to an active instance of a control software as input, wherein the process data comprises at least one of a set of process variables of the industrial process, and plant variables of the industrial plant executing this process;
   based on the input, updating an internal state of the active instance of the control software that is based on a set of internal variables of the active instance;
   based on the updated internal state, determining by the active instance an output signal, and outputting the output signal to at least one piece of equipment that is configured to alter a state and/or a behavior of the industrial process in a tangible way; and
   providing a prioritized subset of the internal variables that characterize the state of the active instance to at least one further instance of a control software that is configured to take over control of the industrial process in case of a failure and/or malfunction of the active instance;
   further comprising operating a failover manager, the failover manager executing a failover method, the failover method comprising:
   mapping a given set of requirements for the behavior of the control system in case of failure and/or malfunction of an active instance of a control software to a configuration of:
   one or more further instances of a control software that are to take over control of the industrial process following the failure and/or malfunction; and
   respective prioritized subsets of internal variables of the active instance that are to be provided to these further instances;
   based at least in part on a determined configuration, creating at least the one or more further instances in respective virtualized execution environments on at least one virtualization platform; and
   orchestrating and/or performing a transfer of the respective prioritized subsets of internal variables from the active instance to the respective further instances of a control software.

2. The method according to claim 1, further comprising determining the prioritized subset of the internal variables by an analysis of at least one of a source code and an object code of the control software that is used as the active instance.

3. The method according to claim 2, wherein the code analysis of the control software comprises an evaluation of one or more of:
   names of accessed variables;
   markings of accessed variables with a retain level;
   a frequency with which variables are accessed and/or used in computations;
   static dependencies between variables;
   a number of variables that are collectively dependent on any one particular variable; and
   a quantitative dependency of the output of the control software on one or more particular variables.

4. The method according to claim 1, further comprising determining the prioritized subset of the internal variables by an analysis of at least one of markings of internal variables, and markings of process or plant variables on which these internal variables depend, with a retain level.

5. The method according to claim 1, wherein the prioritized subset of internal variables comprises at least one of:
   at least one internal variable that is indicative of at least one pressure in the industrial plant executing the process; and
   a current state of all Sequential Function Charts, SFCs, used in the active instance.

6. The method according to claim 1, wherein differently prioritized subsets of internal variables are provided to different further instances of a control software that are configured to take over control of the industrial process within different time periods from the failure or malfunction of the active instance, or in maintenance scenarios.

7. The method according to claim 1, wherein at least one further instance of a control software is configured to control the industrial process in a mode of operation that is degraded compared with a normal mode of operation performed by the active instance.

8. The method of claim 1, wherein the mapping is based at least in part on one or more of:
   a requirement for a level of reliability of the control of the process;
   a requirement for a maximum time period after the failure and/or malfunction during which at least one further instance must take over control of the industrial process;
   a time required to create and/or initialize at least one further instance on the virtualization platform;
   an availability of resources for creating further instances on the virtualization platform;
   an available communication bandwidth between the active instance and at least one further instance; and
   a state and/or phase of the industrial process.

9. The method of claim 1, wherein orchestrating the transfer of prioritized subsets of internal variables to further instances comprises setting up at least one communication channel between the active instance and at least one further instance.

10. The method of claim 9, wherein the communication channel comprises publish/subscribe one-to-many communication, and/or a named pipe.

11. The method of claim 1, wherein the performing a transfer of prioritized subsets of internal variables to further instances comprises buffering prioritized subsets in the failover manager.

12. The non-transitory computer medium comprising computer-executable instructions that, when by a computer, result in:
   providing process data of the industrial process to an active instance of a control software as input, wherein the process data comprises at least one of a set of process variables of the industrial process, and plant variables of the industrial plant executing this process;
   based on the input, updating an internal state of the active instance of the control software that is based on a set of internal variables of the active instance;
   based on the updated internal state, determining by the active instance an output signal, and outputting the output signal to at least one piece of equipment that is configured to alter a state and/or a behavior of the industrial process in a tangible way; and
   providing a prioritized subset of the internal variables that characterize the state of the active instance to at least one further instance of a control software that is configured to take over control of the industrial process in case of a failure and/or malfunction of the active instance,
   wherein the computer-executable instructions further comprise operating a failover manager, the failover manager executing a failover method, the failover method comprising:
      mapping a given set of requirements for the behavior of the control system in case of failure and/or malfunction of an active instance of a control software to a configuration of:
         one or more further instances of a control software that are to take over control of the industrial process following the failure and/or malfunction; and
         respective prioritized subsets of internal variables of the active instance that are to be provided to these further instances;
      based at least in part on a determined configuration, creating at least the one or more further instances in respective virtualized execution environments on at least one virtualization platform; and
      orchestrating and/or performing a transfer of the respective prioritized subsets of internal variables from the active instance to the respective further instances of a control software.

13. The non-transitory computer medium of claim 12, further comprising determining the prioritized subset of the internal variables by an analysis of at least one of a source code and an object code of the control software that is used as the active instance.

14. The non-transitory computer medium of claim 13, wherein the code analysis of the control software comprises an evaluation of one or more of:
   names of accessed variables;
   markings of accessed variables with a retain level;
   a frequency with which variables are accessed and/or used in computations;
   static dependencies between variables;
   a number of variables that are collectively dependent on any one particular variable; and
   a quantitative dependency of the output of the control software on one or more particular variables.

15. The non-transitory computer medium of claim 12, further comprising determining the prioritized subset of the internal variables by an analysis of at least one of markings of internal variables, and markings of process or plant variables on which these internal variables depend, with a retain level.

16. The non-transitory computer medium of claim 12, wherein the prioritized subset of internal variables comprises at least one of:
   at least one internal variable that is indicative of at least one pressure in the industrial plant executing the process; and
   a current state of all Sequential Function Charts, SFCs, used in the active instance.

17. The non-transitory computer medium of claim 12, wherein differently prioritized subsets of internal variables are provided to different further instances of a control software that are configured to take over control of the industrial process within different time periods from the failure or malfunction of the active instance, or in maintenance scenarios.

18. The non-transitory computer medium of claim 12, wherein at least one further instance of a control software is configured to control the industrial process in a mode of operation that is degraded compared with a normal mode of operation performed by the active instance.

* * * * *